United States Patent [19]

Tanisawa

[11] Patent Number: 5,148,507
[45] Date of Patent: Sep. 15, 1992

[54] OPTICAL WAVEGUIDE DEVICE WITH TWO PREDETERMINED WAVELENGTH, POLARIZATION INDEPENDENT, DIRECTIONAL COUPLER SWITCHES

[75] Inventor: Yasuhisa Tanisawa, Tokyo, Japan
[73] Assignee: NEC Corporation, Tokyo, Japan
[21] Appl. No.: 726,793
[22] Filed: Jul. 8, 1991
[30] Foreign Application Priority Data
Jul. 6, 1990 [JP] Japan .................. 2-177350
Aug. 31, 1990 [JP] Japan .................. 2-228043
[51] Int. Cl.[5] .............................. G02B 6/10
[52] U.S. Cl. ......................... 385/41; 385/11; 385/16; 385/40; 385/130; 385/14
[58] Field of Search ........... 350/96.11, 96.12, 96.13, 350/96.14; 370/1, 2, 3, 4; 385/11, 14, 16, 24, 40, 41, 129, 130; 359/117, 122, 124, 128

[56] References Cited

U.S. PATENT DOCUMENTS

| | | | |
|---|---|---|---|
| 4,390,236 | 6/1983 | Alferness | 385/41 X |
| 4,674,829 | 6/1987 | Bulmer et al. | 385/11 X |
| 4,756,588 | 7/1988 | Granestrand | 385/41 |
| 4,909,584 | 3/1990 | Imoto et al. | 385/41 X |
| 4,917,449 | 4/1990 | Granestrand | 385/41 |
| 4,997,245 | 3/1991 | DuPuy et al. | 385/41 X |
| 5,066,086 | 11/1991 | Angenent et al. | 385/41 |

FOREIGN PATENT DOCUMENTS

| | | | |
|---|---|---|---|
| 1-197724 | 9/1989 | Japan | 385/41 X |
| WO-A-8 601 | 3/1986 | PCT Int'l Appl. | 385/16 X |

OTHER PUBLICATIONS

IEEE Journal of Quantum Electronics vol. QE-22, No. 6, Jun. 1986, pp. 933-938, New York, US; J. J. Veselka et al.: "Optimization of Ti:LiNBO3 Optical Waveguides and Directional Coupler".
Electronics Letter, vol. 23, No. 21, Oct. 8, 1987, pp. 1167-1169.
"Low Drive Voltage, Low Crosstalk... Optical Waveguide" 1988 Technical Digest Series, vol. 5, Mar. 28, 1988, pp. 240-243.
"Low Crosstalk and Polarization Independent . . . Switch for OTDR".

*Primary Examiner*—Brian Healy
*Attorney, Agent, or Firm*—Foley & Lardner

[57] ABSTRACT

In an optical waveguide device, a plurality of optical directional coupler switches are provided on a substrate, and light input and output terminals are also provided to be coupled to the optical directional coupler switches. Each of the optical directional coupler switches is provided with a pair of parallel waveguides. One of the optical directional coupler switches operates independently of the polarization of light having a first predetermined wavelength by defining a width of the parallel waveguides and a distance therebetween to be first predetermined values, and one of the optical directional coupler switches operates independently of the polarization of light having a second predetermined wavelength by defining a width of the parallel waveguides and a distance therebetween to be second predetermined values. The parallel waveguides of the first and second ones of the optical directional coupler switches are provided by diffusing films of the same thickness deposited in a predetermined pattern on the substrate thereinto by a predetermined diffusing condition.

5 Claims, 13 Drawing Sheets

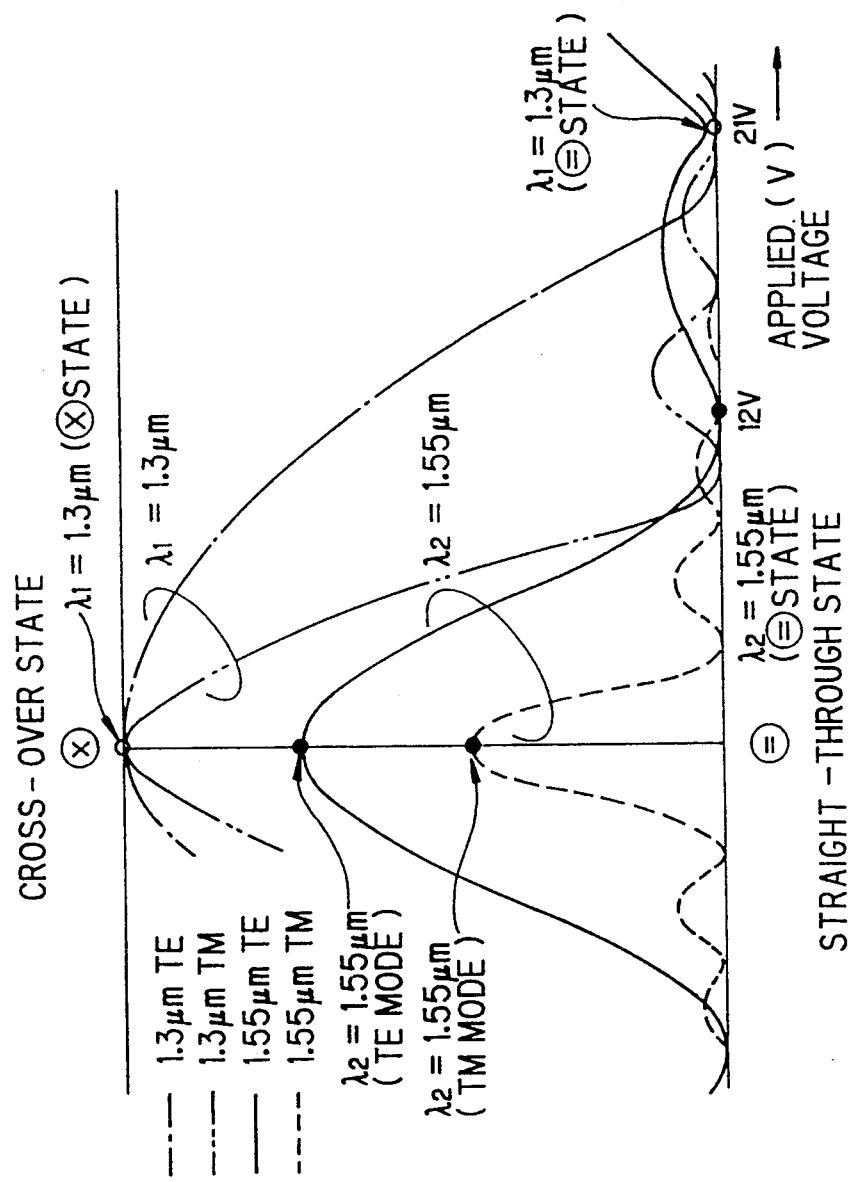

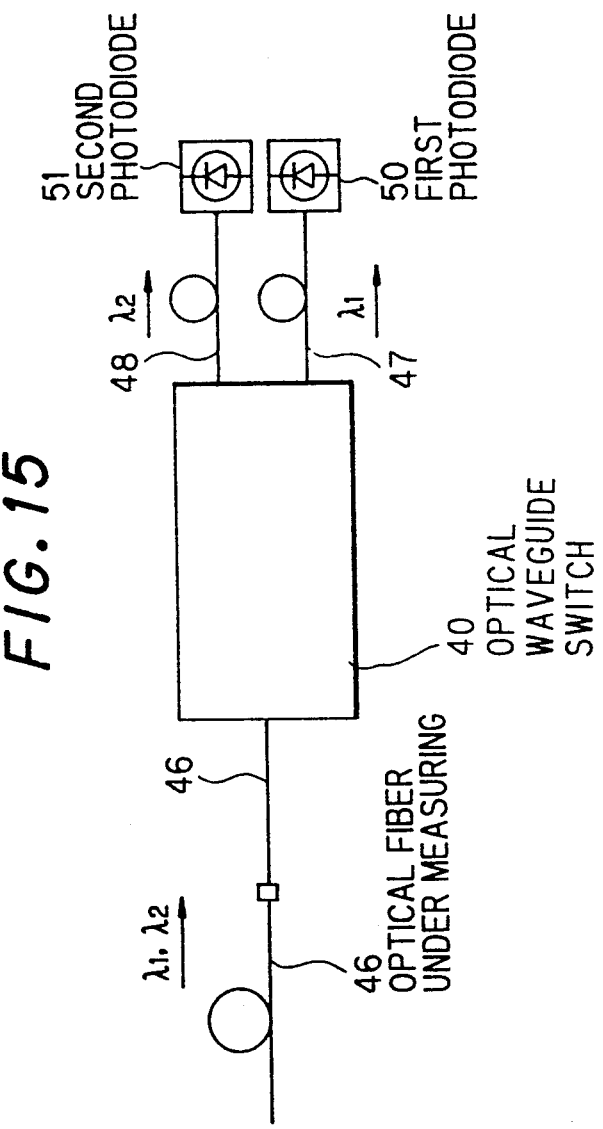

OPTICAL WAVEGUIDE DEVICE WITH TWO PREDETERMINED WAVELENGTH, POLARIZATION INDEPENDENT, DIRECTIONAL COUPLER SWITCHES

FIELD OF THE INVENTION

This invention relates to an optical waveguide device, and more particularly to, an optical waveguide device which functions as an optical switch for selectively switching lights having different wavelengths.

BACKGROUND OF THE INVENTION

An optical waveguide device is a device for modulating phase or intensity of a light or switching an optical path of a light by changing the index of refraction of a waveguide included therein. In the optical waveguide device, a waveguide having a high index of refraction is formed in a ferroelectric or semiconductor substrate to confine the light propagated therethrough, and electrodes for applying a voltage are formed on or in the vicinity of the waveguide. In operation, a predetermined level of voltage is applied to the electrodes to change the index of refraction of the waveguide, so that the light which propagates therethrough is modulated in phase or intensity. In the same manner, the optical path is changed over among a plurality of waveguides.

One type of a conventional optical waveguide device includes a substrate consisting of lithium niobium oxide ($LiNbO_3$) which is a ferroelectric material having high electro-optical effects, first and second waveguides consisting of Ti-diffused regions formed in the substrate, and first and second electrodes formed above the waveguides through an insulation, respectively. The first and second waveguides have a predetermined length of parallel portions close to each other with a predetermined gap.

In operation, when there is no voltage applied across the electrodes, there occurs a so called mode coupling between the close portions of the two waveguides, so that some proportion of light is transmitted from the first waveguide to the second waveguide at the close portions, and some proportion of light is transitted from the second waveguide to the first waveguide. If the length of the close portions of the waveguides is selected adequately, almost 100% of the light transmits from one waveguide to the other at the close portions thereof. Such a state is defined as a cross-over state hereinafter.

When, a predetermined value of the voltage is applied to the electrodes, there is generated an electric field, so that the index of refraction of the substrate changes due to the electro-optical effects of the substrate, and the coupling state of the close portions of the waveguides changes. If the value of the voltage thus applied is selected to be adequate, mode coupling does not occur, so that light supplied to the first and second waveguides pass therethrough straightly. Such a state is defined as a straight through or bar state hereinafter.

According to the conventional optical waveguide device, however, there is a disadvantage in that the operation state thereof is not stable and is dependent on the polarization of the supplied light. This is an obstacle to development of optical switches.

Next, a conventional directional coupler type optical switch which is independent of the polarization of light will be explained. In the directional coupler type optical switch, the density of a Ti diffused waveguide region is controlled to have the same value in a complete coupling length of the switch in both the TE mode and the TM mode by adjusting a thickness of a Ti layer provided on a substrate prior to the Ti-diffusion.

There has been developed an optical switch having a stable operation performance independent of the polarization for a light having a wavelength of 1.3 $\mu$m. On the other hand, it is theoretically possible to realize the polarization-independence of the switch in which the complete coupling length thereof has the same value in both the TE mode and the TM mode of the light of 1.55 $\mu$m by adjusting the thickness of the Ti layer.

However, conditions of optical confinement in the waveguide are different among lights having different wavelengths at the same Ti density of the waveguide, so that conditions of fabricating the optical switch on which the complete coupling length thereof has the same value in both TE mode and TM mode are different between lights having wavelengths of 1.3 $\mu$m and 1.55 $\mu$m, respectively. Therefore, it is difficult to form optical switches, one of which is for a light of 1.3 $\mu$m and the other is for a light of 1.55 $\mu$m in the same substrate by the same fabricating process.

Therefore, a conventional optical switch includes a first switching element for a light of 1.3 $\mu$m and a second switching element for a light of 1.55 $\mu$m formed in different substrates, respectively. Such an optical switch has the disadvantage of high fabrication costs, because the switching elements must be formed in the different substrates.

SUMMARY OF THE INVENTION

Accordingly, it is an object of the invention to provide an optical waveguide device in which optical signals having different wavelengths are switched selectively at low cost.

According to a feature of the invention, an optical waveguide device comprises:

a plurality of optical directional coupler switches provided on a substrate, each of the optical directional coupler switches being provided with a pair of parallel waveguides;

means for applying the voltage across the parallel waveguides; and light input and output terminals coupled to the optical directional coupler switches wherein:

at least first one of the optical directional coupler switches operates independently of the polarization of light having a first predetermined wavelength by defining the width of the parallel waveguides and a distance therebetween to be first predetermined values, and at least second one of the optical directional coupler switches operates independently of the polarization of light having a second predetermined wavelength by defining the width of the parallel waveguides and a distance therebetween to be second predetermined values, the parallel waveguides of the first and second ones of the optical directional coupler switches being provided by diffusing films of the same thickness deposited in a predetermined pattern on the substrate thereinto by a predetermined diffusing condition.

BRIEF DESCRIPTION OF THE DRAWINGS

The invention will be explained in more detail in conjunction with appended drawings wherein:

FIG. 14 is a graph showing switching characteristics of the optical waiveguide switch in respect to a wavelength of 1.3 $\mu$m and 1.55 $\mu$m; and FIG. 15 is a block diagram illustrating an OTDR in which the optical waveguide device of FIG. 12 is used.

DESCRIPTION OF THE PREFERRED EMBODIMENTS

Before describing an optical waveguide device in preferred embodiments according to the invention, the conventional directional coupler type switching element and the conventional optical waveguide device described before will be explained in conjunction with FIGS. 1 to 5.

Figure 1:
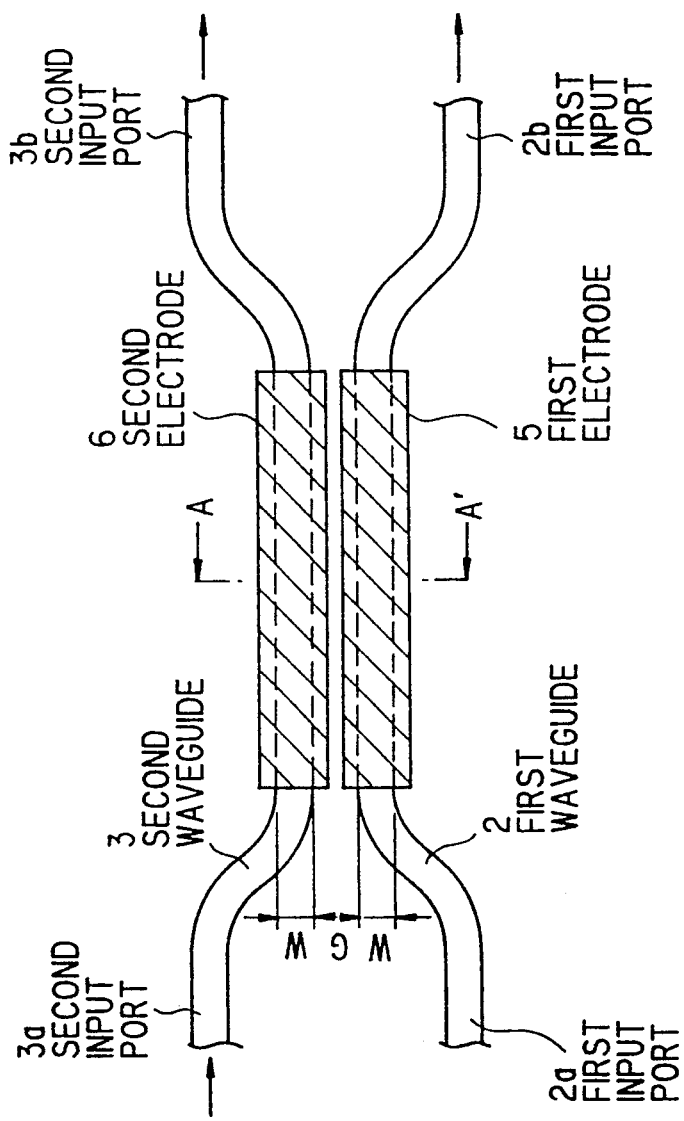
FIG. 1 is a schematic plan view illustrating a conventional directional coupler type switching element.

The conventional directional coupler type switching element will be explained in conjunction with FIGS. 1 and 2.

The conventional directional coupler type switching element includes a substrate 1 consisting of LiNbO$_3$ which has relatively high electro-optical effects among ferroelectric materials, first and second waveguides 2 and 3 consisting of Ti-diffused regions formed in the substrate 1 in the vicinity of the surface thereof, an SiO$_2$ buffer layer 4 covering the surface of the substrate 1, and first and second electrodes 5 and 6 of metal formed through the SiO$_2$ buffer layer 4 above the waveguides 2 and 3, respectively. The first and second waveguides 2 and 3 have a predetermined length of parallel portions close to each other with a predetermined gap G.

A process for fabricating the directional coupler type switching element will be explained. First, Ti layer is formed on the substrate of a wafer, and then the Ti layer is patterned to have a pattern of the waveguides. After that, the substrate is heated at a high temperature of approximately 1000° C. for a few hours to diffuse Ti into the substrate to form the waveguides therein. Then, SiO$_2$ buffer layer is formed to cover the surface of the substrate.

Finally, electrodes are formed through the SiO$_2$ buffer layer above the waveguides.

The wafer thus fabricated is cut to a plurality of chips. The chip is polished at facets. Then, the chip as a directional coupler type switching element is connected with optical fibers while optical axes of the chip and the optical fibers are adjusted to be aligned to each other. Then, the chip is mounted in a package. Finally, electrode pads of the chip and signal terminals provided in the package are connected to each other by wirebonding.

In operation, when there is no voltage applied to the electrodes 5 and 6, there occurs mode coupling between the two waveguides 2 and 3 at the close portions, so that some proportion of the light supplied from a first input port 2a of the first waveguide 2 is transmitted from the first waveguide 2 to the second waveguide 3 at the close portions and supplied from the second output port 3b of the second waveguide 3, on the other hand, some proportion of the light supplied from a second input port 3a of the second waveguide 3 is transmitted from the second waveguide 3 to the first waveguide 2 at the close portions and supplied from the first output port 2b of the first waveguide 2. If the length of the close portions of the waveguides 5 and 6 is selected adequately in accordance with conditions of the fabrication of the directional coupler type optical switch, almost 100% of the light transmits from one waveguide to the other at the close portions thereof (cross-over state).

Figure 2:
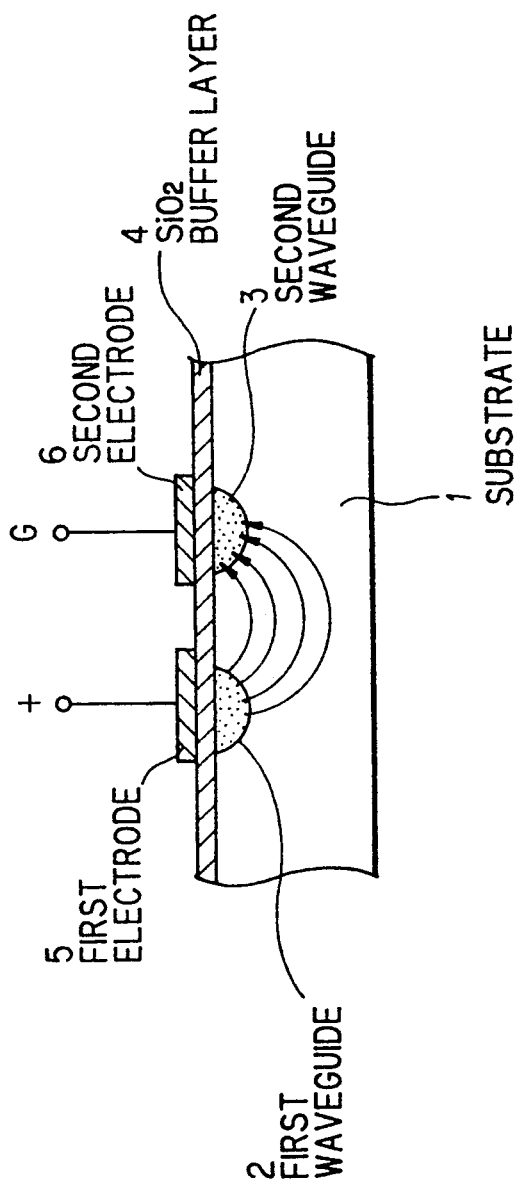
FIG. 2 is a cross-sectional view of the conventional directional coupler type switching element taken partly across a line A—A of FIG. 1.

When, a predetermined value of the voltage is applied to the electrodes 5 and 6 in which the first electrode 5 is applied with a high level while the second electrode 6 is kept to be a ground level, there is generated an electric field in the direction perpendicular to the axes of the waveguides 5 and 6, as shown in FIG. 2, so that the index of refraction of the substrate 1 changes due to the electro-optical effects of the substrate 1, and the coupling state of the close portions of the waveguides 5 and 6 changes.

If the voltage thus applied is selected to be adequate, there occurs no mode coupling, so that the light supplied to the first input port 2a is supplied from the first output port 2b, and the light supplied to the second input port 3a is supplied from the second output port 3b (straight-through or bar state).

Such an optical waveguide device has been developed for a matrix optical switch for an optical exchanging system or an optical switch for changing over an optical path of an optical time-domain reflectometer (OTDR), as the switching function described above is integrated on the substrate 1 in the optical waveguide device. Further, it is expected that the optical waveguide device may be used as an external modulator for massive optical communications.

According to the conventional optical waveguide device, however, there is a disadvantage in that the operation state thereof is not stable and is dependent on the polarization of the supplied light.

Japanese Patent Provisional Publication (Kokai) No. 1-197724 (published on Jul. 9, 1989) and a report of "Low-drive-voltage and low-loss polarization-independence LiNbO$_3$ optical waveguide switches", Electronics Letters, vol. 23, No. 21, Oct. 8, 1987 describe a directional coupler type optical switch which is independent of polarization of the light. In the directional coupler type optical switch, the Ti density of a waveguide region after diffusing is controlled by adjusting the thickness of a Ti layer befor diffusing to have the same value in a complete coupling length of the switch in both TE mode and TM mode. There has been developed an optical switch having a stable operation performance independent of the polarization for a light having a wavelength of 1.3 μm.

On the other hand, as for a light having a wavelength of 1.55 μm which has advantages such as low transmission loss, there is a requirement for an optical switch or an optical modulator for the light having a wavelength of 1.55 μm. It is possible theoretically to realize the polarization independence of the switch in which the complete coupling length thereof has the same value in both TE mode and TM mode of by adjusting the thickness of the Ti layer of the waveguide before diffusing.

However, conditions of optical confinement in the waveguide are different among lights having different wavelengths at the same Ti density of the waveguide, so that conditions of fabricating the optical switch on which the complete coupling length thereof has the same value in both TE mode and TM mode of the light are different between lights having wavelengths of 1.3 μm and 1.55 μm, respectively. Therefore, it is difficult to form optical switches one of which is for a light of 1.3 μm and the other is for a light of 1.55 μm in the same substrate by the same fabricating process.

Figure 3:
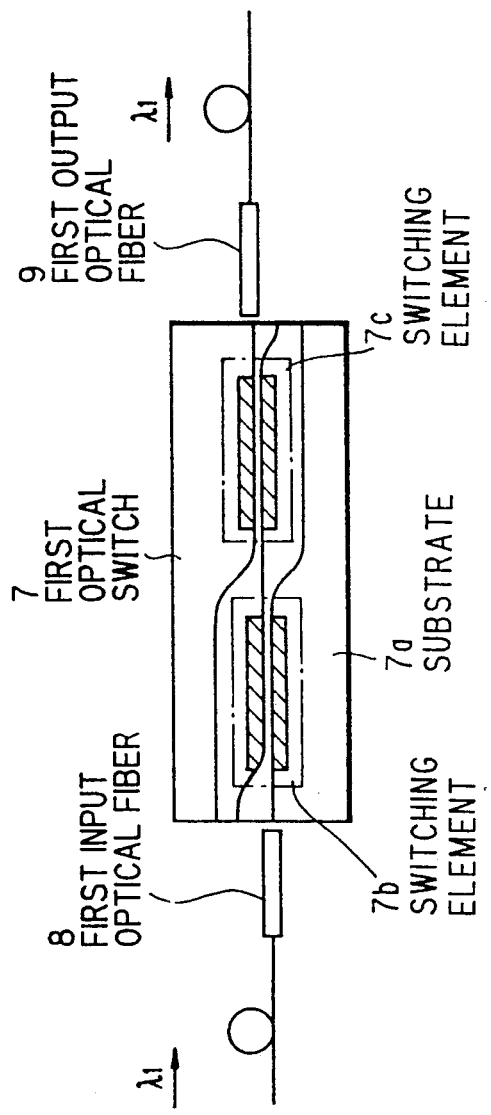
FIG. 3 is a schematic plan view illustrating a conventional optical waveguide device for an optical signal having a wavelength $\lambda_1$.

Next, the conventional optical switch will be explained in conjunction with FIGS. 3 and 4. In FIG. 3, a first optical switch 7 for a light of 1.3 μm includes two switching elements 7b and 7c connected serially and formed in a substrate 7a. The switching elements 7b and 7c have a complete coupling length of 19 mm in both TE and TM modes, on the conditions that the thickness of the Ti layer forming a waveguide be 470 Å before diffusing, the diffusion process be carried out at 1050° C. for 8 hours, the width of the waveguides being 9 μm, and the gap between the waveguides being 9 μm.

Figure 4:
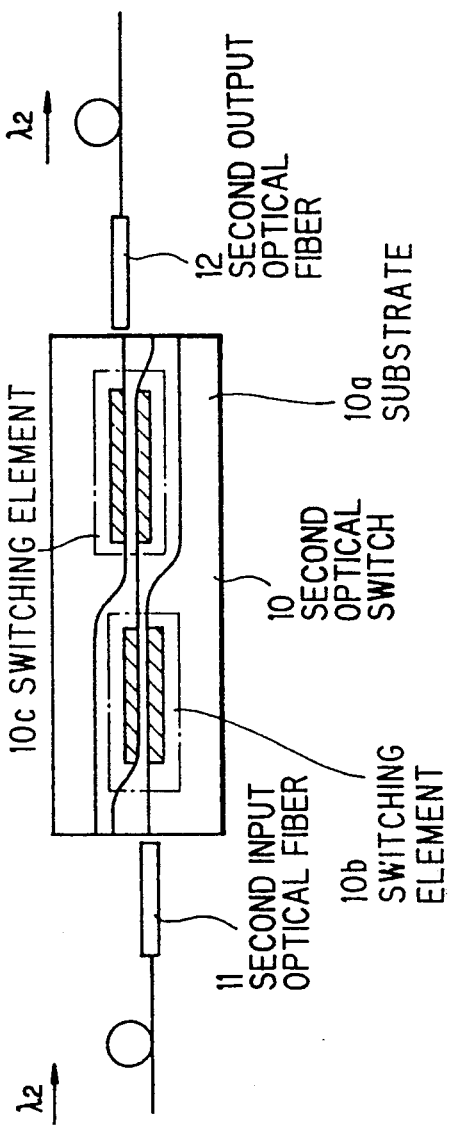
FIG. 4 is a schematic plan view illustrating a conventional optical waveguide device for an optical signal having a wavelength $\lambda_2$.

On the other hand, in FIG. 4, a second optical switch 10 for a light of 1.55 μm includes two switching elements 10b and 10c connected serially and formed in a substrate 10a. The switching elements 10b and 10c have a complete coupling length of 20 mm in both TE and TM modes on the conditions that the thickness of the Ti layer forming a waveguide be 500 Å before diffusing, the width of the waveguide be 10 μm, and the gap between the waveguides be 8 μm. Conditions of the diffusion process are the same as those in the first optical switch.

An OTDR using an electro-optical switch described above is described in "Low crosstalk and polarization independent Ti:LiNbO$_3$ Optical waveguide switch for OTDR", Integrated and Guided-Wave Optics, 1988 Technical Digest Series, vol. 5, Mar. 28 to 30, 1988. The OTDR for optical measuring is required to be able to measure lights of both 1.3 μm and 1.55 μm, as the range of wavelengths of lights to be used in optical communications becomes wide.

Figure 5:
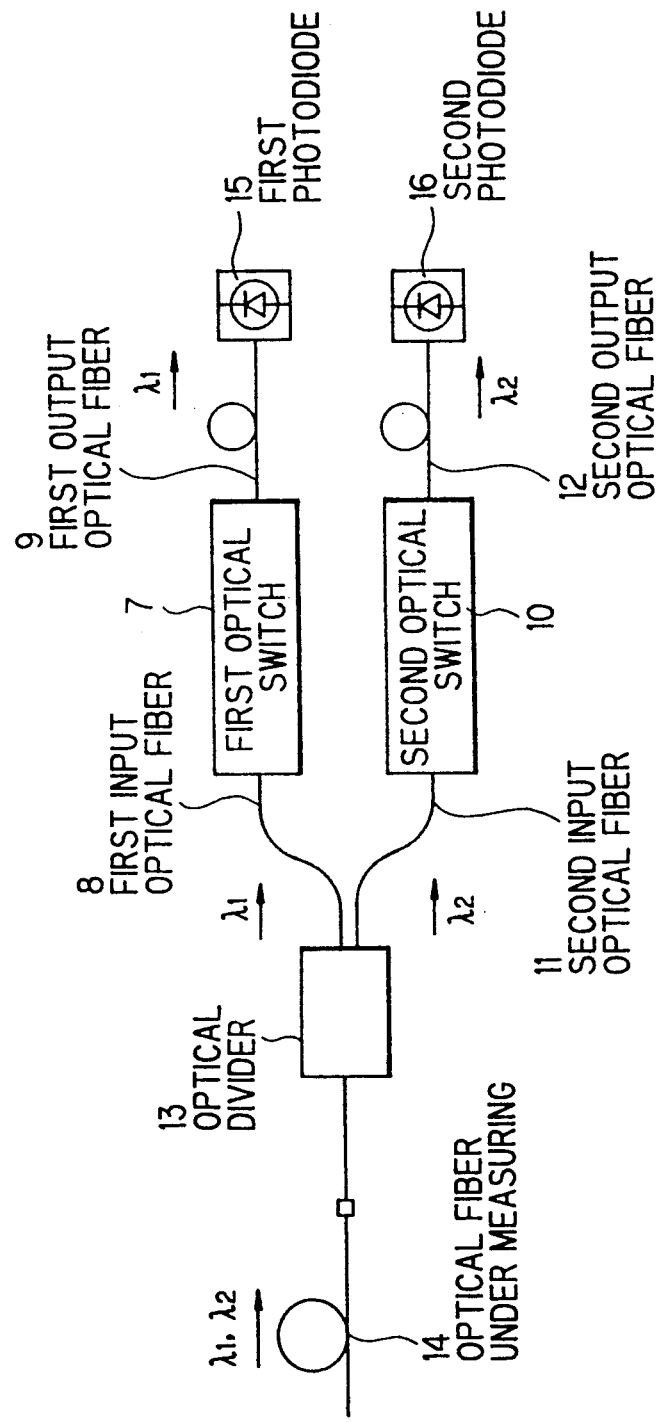
FIG. 5 is a block diagram illustrating an OTDR in which the conventional optical waveguide devices of FIGS. 4 and 5 are used.

In FIG. 5, the OTDR includes first and second optical switches 7 and 10. An optical divider 13 which divides a light to two lights having different wavelengths is connected at an input with an optical fiber 14 under measuring through which a light having a wavelength of $\lambda_1$ (=1.3 μm) or $\lambda_2$ (=1.55 μm) propagates, and at two outputs with first and second input optical fibers 8 and 11, respectively. The first optical switch 7 is connected at an input with the first input optical fiber 8 and at an output with a first output optical fiber 9 which is connected at the other end to a first photodiode 15. The second optical switch 10 is connected at an input with the second input optical fiber 11 and at an output with a second output optical fiber 12 which is connected at the other end to a second photodiode 16.

In operation, either a light of $\lambda_1$ (=1.3 μm) or a light of $\lambda_2$ (=1.55 μm) is irradiated from a laser diode (not shown) to propagate through the optical fiber 14. The light is divided in the optical divider 13, where the light of $\lambda_1$ is supplied to the first input optical fiber 8 to path through the first optical switch 7 and then supplied to the first photodiode 15 through the first output optical fiber 9, while the light of $\lambda_2$ is supplied to the second input optical fiber 11 to a path through the second optical switch 10 and then supplied to the second photodiode 16 through the second output optical fiber 12.

Next, an optical waveguide device for 2 wavelength-type OTDR for measuring lights of 2 wavelengths of $\lambda_1$ (=1.3 μm) and $\lambda_2$ (=1.55 μm) in a first preferred embodiment according to the invention will be explained.

Figure 6:
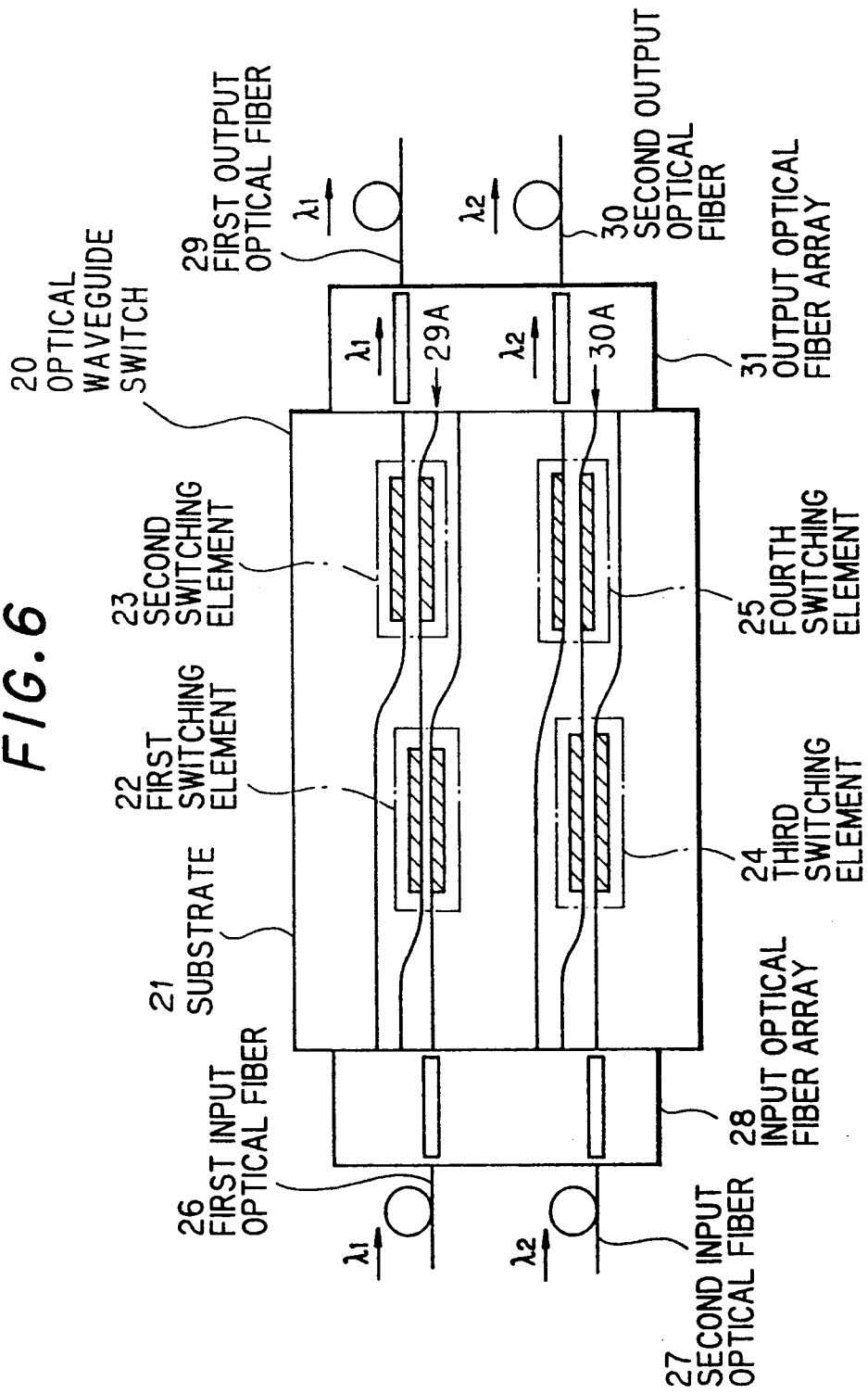
FIG. 6 is a schematic plan view illustrating an optical waveguide device in a first preferred embodiment according to the invention.

In FIG. 6, the optical waveguide device 20 includes first to fourth switching elements 22 to 25 formed in a substrate 21 consisting of lithium niobate. Two series of the switching elements are arranged in parallel, one of which consists of the first and second switching elements 22 and 23 serially connected for a light of $\lambda_1$ (=1.3 μm), and the other consists of the third and fourth switching elements 24 and 25 serially connected for a light of $\lambda_2$ (=1.55 μm) in order to increase a quenching rate. An input optical fiber array 28 is provided with first and second input optical fibers 26 and 27, connected to the first and third switching elements 22 and 24, respectively. On the other hand, an output optical fiber array 31 is provided with first and second output optical fibers 29 and 30, connected to the second and fourth switching elements 23 and 25, respectively. The both facets of the substrate 21 are polished and fixed with the input and output optical fiber arrays 28 and 31, respectively, by adjusting the axes of the optical fibers perpendicular to the facet plains of the substrate 21.

Each of the switching elements include two waveguides consisting of Ti-diffused regions in the substrate 21 formed by the same process and conditions of a thickness of 450 Å before diffusing and a diffusing at 1050° C. for 8 hours. Each of the first and second switching elements 22 and 23 has a waveguide width W of 9 μm, a gap G between the waveguides of 9 μm, and a complete coupling length $L_c$ of 18 mm in both TE mode and TM mode. On the other hand, each of the third and fourth switching elements 24 and 25 has the waveguide width W of 11.5 μm, the gap G of 9.5 μm, and the complete coupling length $L_c$ of 22 mm in both TE mode and TM mode.

In operation, the lights having the wavelengths $\lambda_1$ and $\lambda_2$ are switched on and off by controlling a voltage applied across the electrodes to provide CROSS and BAR states as indicated in the table below.

| WAVELENGTH | SWITCHING ELEMENT | | | | SWITCHING STATE |
|---|---|---|---|---|---|
| | 22 | 23 | 24 | 25 | |
| $\lambda_1$ | CROSS | CROSS | | | ON |
| | BAR | BAR | | | OFF |
| $\lambda_2$ | | | CROSS | CROSS | ON |
| | | | BAR | BAR | OFF |

On the other hand, the lights having the wavelengths $\lambda_1$ and $\lambda_2$ may be changed over as indicated in the table below, provided that the changed-over lights obtained at output terminals 29A and 30A.

| WAVELENGTH | SWITCHING ELEMENT | | | |
|---|---|---|---|---|
| | 22 | 23 | 24 | 25 |
| $\lambda_1$ | CROSS | BAR | | |
| $\lambda_2$ | | | CROSS | BAR |

Figure 7:
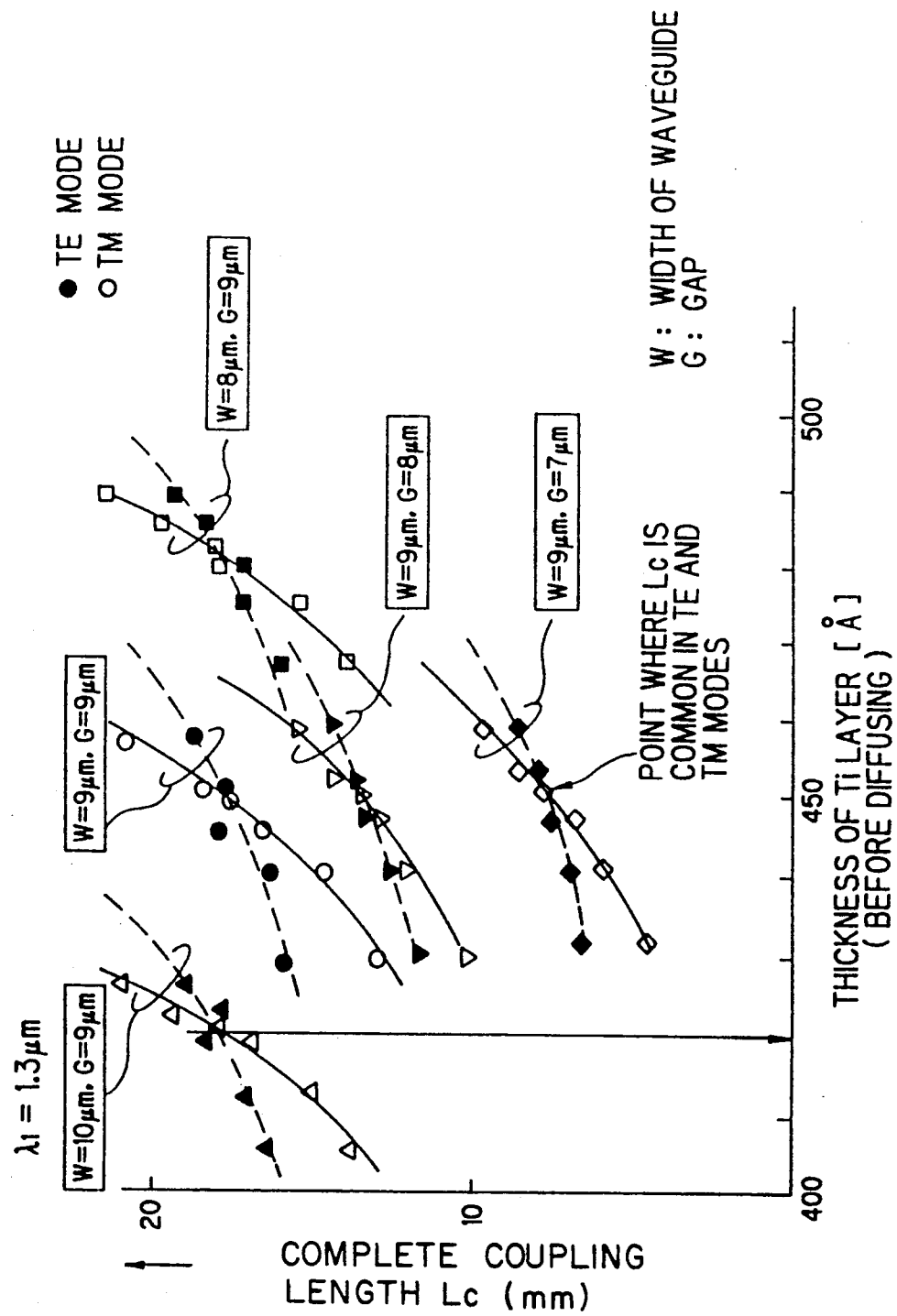
FIG. 7 is a graph showing the relation between a thickness of Ti layer and a complete coupling length in TE and TM modes in a directional coupler type switching element of the optical waveguide device when the wavelength of an optical signal is 1.3 $\mu$m.
Figure 8:
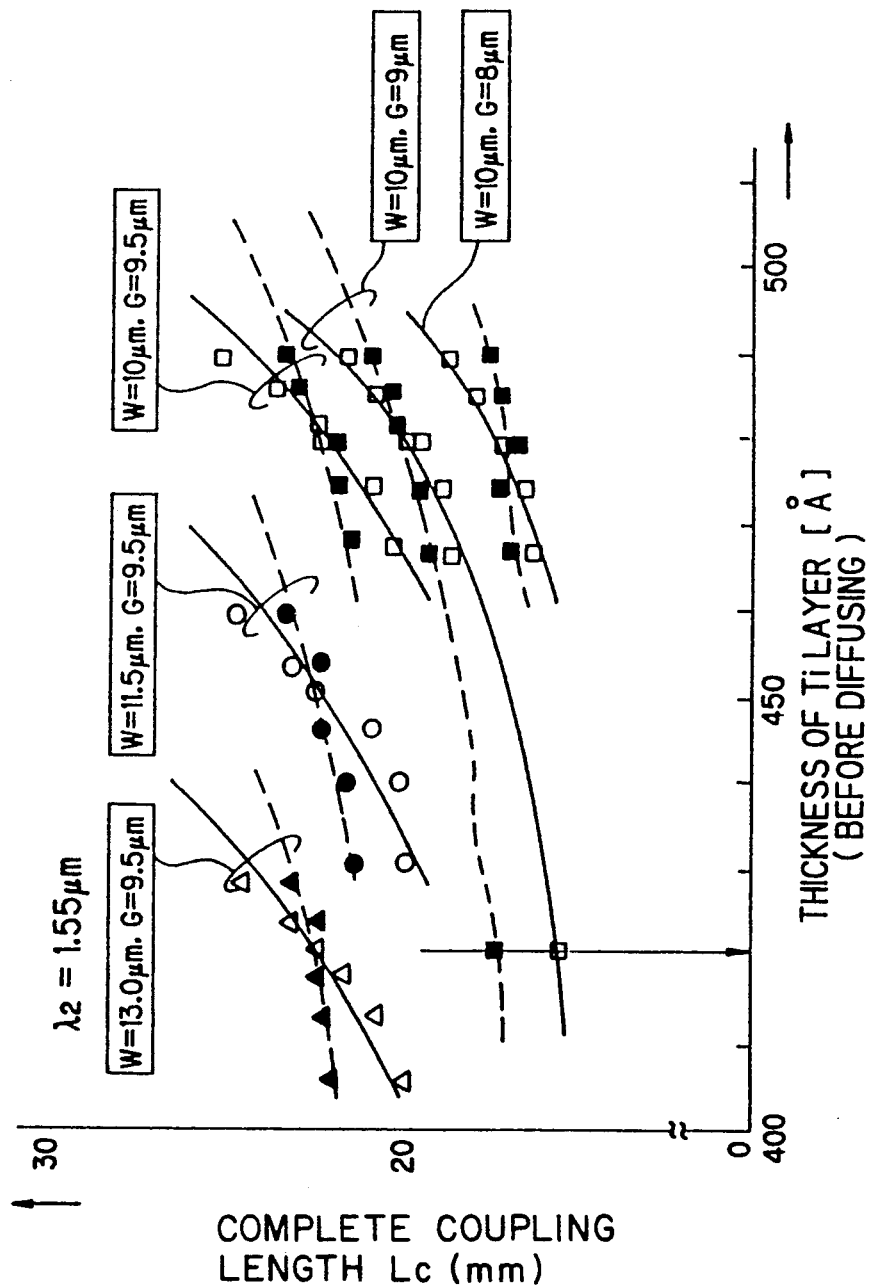
FIG. 8 is a graph showing the relation between the thickness of Ti layer and a complete coupling length in both TE and TM modes in the directional coupler type switching element of the optical waveguide device when a wavelength of an optical signal is 1.55 $\mu$m.

Such a condition is confirmed by the following process. FIGS. 7 and 8 respectively show a relation between the thickness of Ti layer and a complete coupling length $L_c$ in TE and TM modes in the switching element in cases of the wavelength of 1.3 μm and 1.55 μm, respectively. The diffusion of Ti is carried out at 1050° C. for 8 hours in both cases.

As shown in FIG. 7, in the light of $\lambda_1$ (=1.3 μm), if the waveguide width W is fixed to be 9 μm, the complete coupling length $L_c$ has the same value in both TE and TM modes on the condition that the thickness of Ti layer before diffusing is 450 Å, though the value thereof depends on the gap G between the waveguides, which is 18 mm at G=9 μm, 13 mm at G=8 μm, and 8 mm at G=7 μm. On the other hand, if the gap G is fixed to be 9 μm, the complete coupling length $L_c$ has the same value in both TE and TM modes on the condition that the thickness of Ti layer before diffusing depends on the waveguide width W, which is 420 Å at W=10 μm, 450 Å at W=9 μm, and 480 Å at W=8 μm, however, the value thereof is 20 mm in any condition so far as the gap is 9 μm.

Next, as shown in FIG. 8, in the light of $\lambda_2$ (=1.55 μm), if the waveguide width W is fixed to be 10 μm, the complete coupling length $L_c$ has the same value in both TE and TM modes on a condition that a thickness of Ti layer before diffusing is 480 Å. On the other hand, if the gap G is fixed to be 9.5 μm, the complete coupling length $L_c$ has the same value in both TE and TM modes locates on the condition that the thickness of Ti layer before diffusing depends on the waveguide width W, which is 420 Å at W=13 μm, 450 Å at W=11.5 μm, and 480 Å at W=10 μm.

Thus, the condition of the thickness of Ti layer can be adjusted by changing the waveguide width W to have the same value of the complete coupling length $L_c$ in both TE and TM modes. However, if the waveguide width W is too narrow, the propagation loss may increase even if the Ti layer is thick enough, because optical confinement in TE mode is not sufficient in such a case. On the other hand, if the Ti layer is too thin, the coupling loss of the optical fiber may increase even if the waveguide width W is wide enough, because the distribution of the Ti density in the substrate becomes broad.

Figure 9:
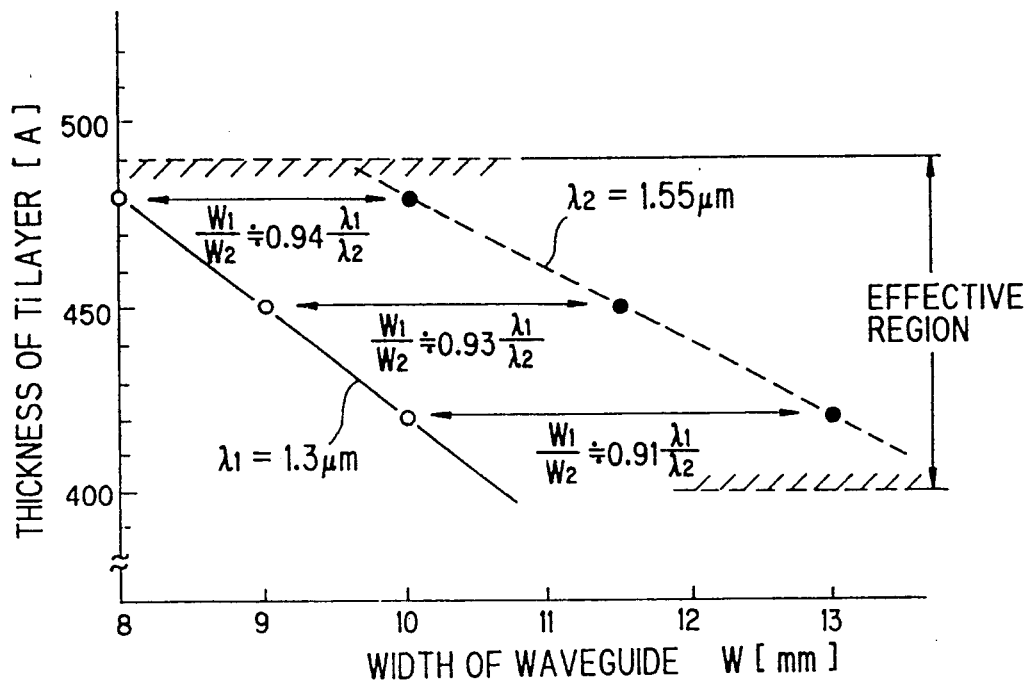
FIG. 9 is a graph showing the relation between a width of the waveguide and a thickness of Ti layer of the directional coupler type switching element based on the conditions of the equation for the complete coupling length in both TE and TM modes.

FIG. 9 shows a relation between the waveguide width W and the thickness of Ti layer before diffusing on the condition that the complete coupling length $L_c$ has the same value in both TE and TM modes. The region shown by oblique lines represents an effective region where the waveguide width W and the thickness of the Ti layer are preferable in light of the propagation loss and the coupling loss explained above.

Figure 10:
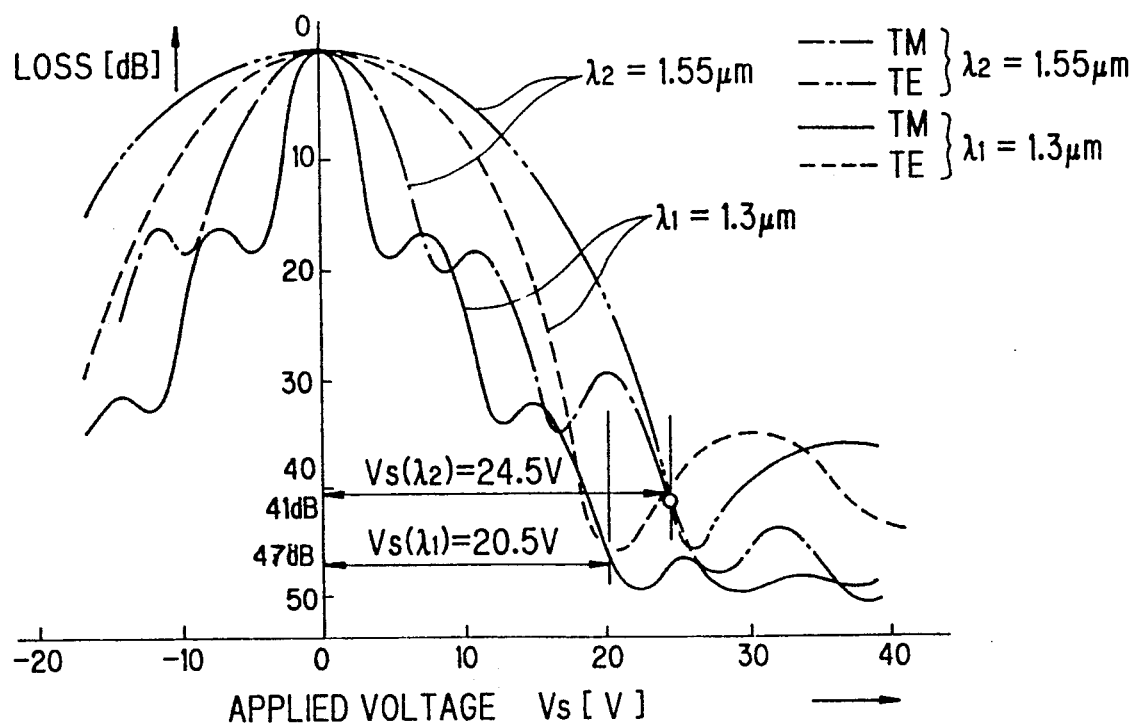
FIG. 10 is a graph showing switching characteristics of the optical waveguide device in wavelengths of 1.3 $\mu$m and 1.55 $\mu$m in the first preferred embodiment according to the invention.

FIG. 10 shows switching characteristics of the optical waveguide device. In all of the switching elements of the optical waveguide device, the loss is 0 (in other words, all of the switching elements are in cross-over state), when no voltage is applied to the electrodes. However, the first and second switching elements 22 and 23 become straight-through state in both TE and TM modes when a voltage $V_s(\lambda_1)$ of 20.5 V is applied to the electrodes thereof, and the third and fourth switching elements 24 and 25 become straight-through state in both TE and TM modes, when the voltage $V_s(\lambda_2)$ of 24.5 V is applied to the electrodes thereof.

The complete coupling length $L_c$ may be selected in accordance with the waveguide width W as described before, and the voltage required for changing the state of the switching element from the cross-over state to the straight-through state increases if the complete coupling length becomes short, so that it is possible for all the switching elements to have the same voltage level by which the state is changed.

Figure 11:
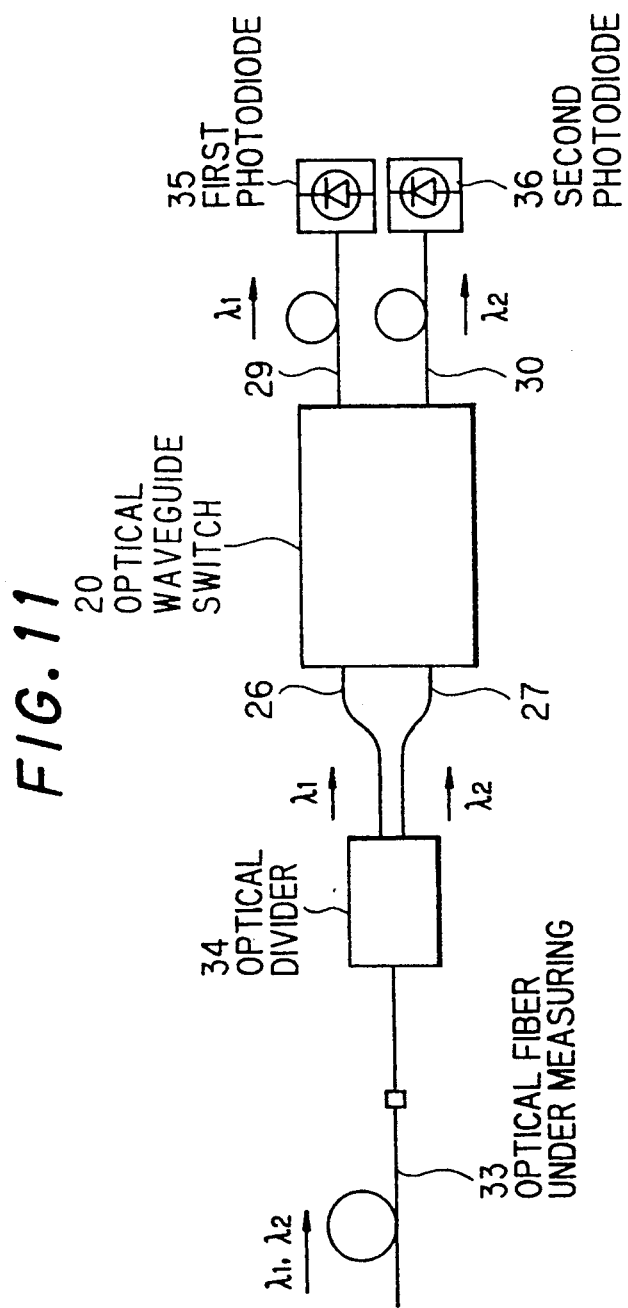
FIG. 11 is a block diagram illustrating an OTDR in which the optical waveguide device of FIG. 6 is used.

Next, a 2-wavelength type OTDR using the optical waveguide device 20 will be described in conjunction with FIG. 11. In the OTDR, the optical waveguide switch 20 is connected at an input to an optical divider 34 through first and second input optical fibers 26 and 27, and at an output to first and second photodiodes 35 and 36 through first and second output optical fibers 29 and 30. The optical divider 34 is connected with an optical fiber 33 under measuring through which a light having a wavelength of $\lambda_1$ (=1.3 μm) or $\lambda_2$ (=1.55 μm) propagates.

In operation, either a light of $\lambda_1$ (=1.3 μm) or a light of $\lambda_2$ (=1.55 μm) is irradiated from a laser diode (not shown) to the optical fiber 33 under measuring. The light which returned to reach the optical divider 34 is divided therein, where the light of $\lambda_1$ is supplied to the first input optical fiber 26 to a path through the first and second switching elements 22 and 23 and then supplied to the first photodiode 35 through the first output optical fiber 29, while the light of $\lambda_2$ is supplied to the second input optical fiber 27 to path through the third and fourth switching elements 24 and 25 and then supplied to the second photodiode 36 through the second output optical fiber 30. A reflecting light from junctions, connections, or broken points of the optical fiber 33 under measuring is cut off at the optical waveguide switch 20, so that it is avoided to increase a region where the measurement is impossible due to saturation of the photodiodes 35 and 36.

Next, an optical waveguide device for 2 wavelength-type OTDR measuring lights of 2 wavelengths of $\lambda_1$ (=1.3 μm) and $\lambda_2$ (=1.55 μm) in a second preferred embodiment according to the invention will be explained.

Figure 12:
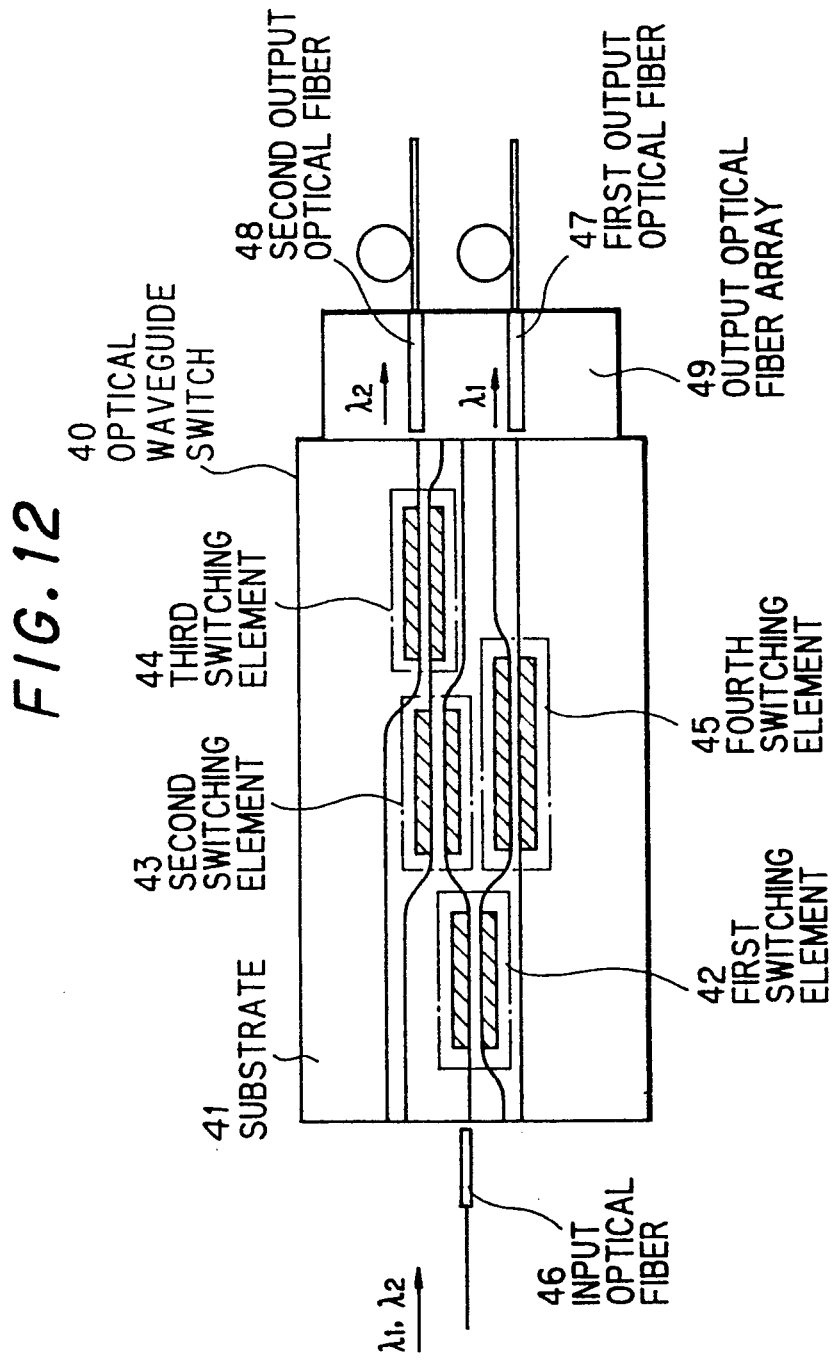
FIG. 12 is a schematic plan view illustrating an optical waveguide device in a second preferred embodiment according to the invention.

In FIG. 12, the optical waveguide device 40 includes first to fourth switching elements 42 to 45 formed in a substrate 41 consisting of lithium niobate. The first switching element 42 is connected at an input with an input optical fiber 46, at two outputs of waveguides to each one input of waveguides of the second and fourth switching elements 43 and 45. The fourth switching element 45 is connected at an output with a first output optical fiber 47. The second and third switching elements 43 and 44 are connected serially, and the third switching element 44 is connected at an output with a second output optical fiber 48.

All of waveguides of the switching elements 42 to 45 are formed by forming Ti layers having a thickness of 420 Å and diffusing at 1050° C. for 8 hours. The first and fourth switching elements 42 and 45 each of which functions as a switch for a light of $\lambda_1$ (=1.3 $\mu$m) have a waveguide width W of 10 $\mu$m, a gap G between the waveguides of 9 $\mu$m, and a complete coupling length $L_c$ in both TE and TM modes of 18 mm. On the other hand, the second and third switching elements 43 and 44 each of which functions as a switch for a light of $\lambda_2$ (=1.55 $\mu$m) have the waveguide width W of 13 $\mu$m, the gap G of 8 $\mu$m, and the complete coupling length $L_c$ of 15 mm.

Next, the operation of the first switching element 42 which functions as a wavelength filter will be explained. A directional coupler which becomes cross-over state when a light of 1.3 $\mu$m is supplied thereto and becomes straight-through state when a light of 1.55 $\mu$m is supplied thereto may be adopted as a wavelength filter. However, there is no condition on which the directional coupler becomes cross-over state when a light of 1.3 $\mu$m is supplied thereto in both TE and TM modes and becomes straight-through state when a light of 1.55 $\mu$m is supplied thereto in both TE and TM modes, so that a high polarization-independence performance can not be obtained by the directional coupler. Therefore, a switching element is used as a wavelength filter.

When no voltage is applied to electrodes of the first switching element 42, the first switching element 42 becomes cross-over state, so that a light of 1.3 $\mu$m supplied thereto transmits to the fourth switching element 45 to be supplied to the first output optical fiber 47. On this condition, however, the confinement of a light of 1.55 $\mu$m is not sufficient, so that the complete coupling length $L_c$ has different values in TE and TM modes, that is 15 mm in TE mode and 13 mm in TM mode, as shown in FIG. 8.

Figure 13:
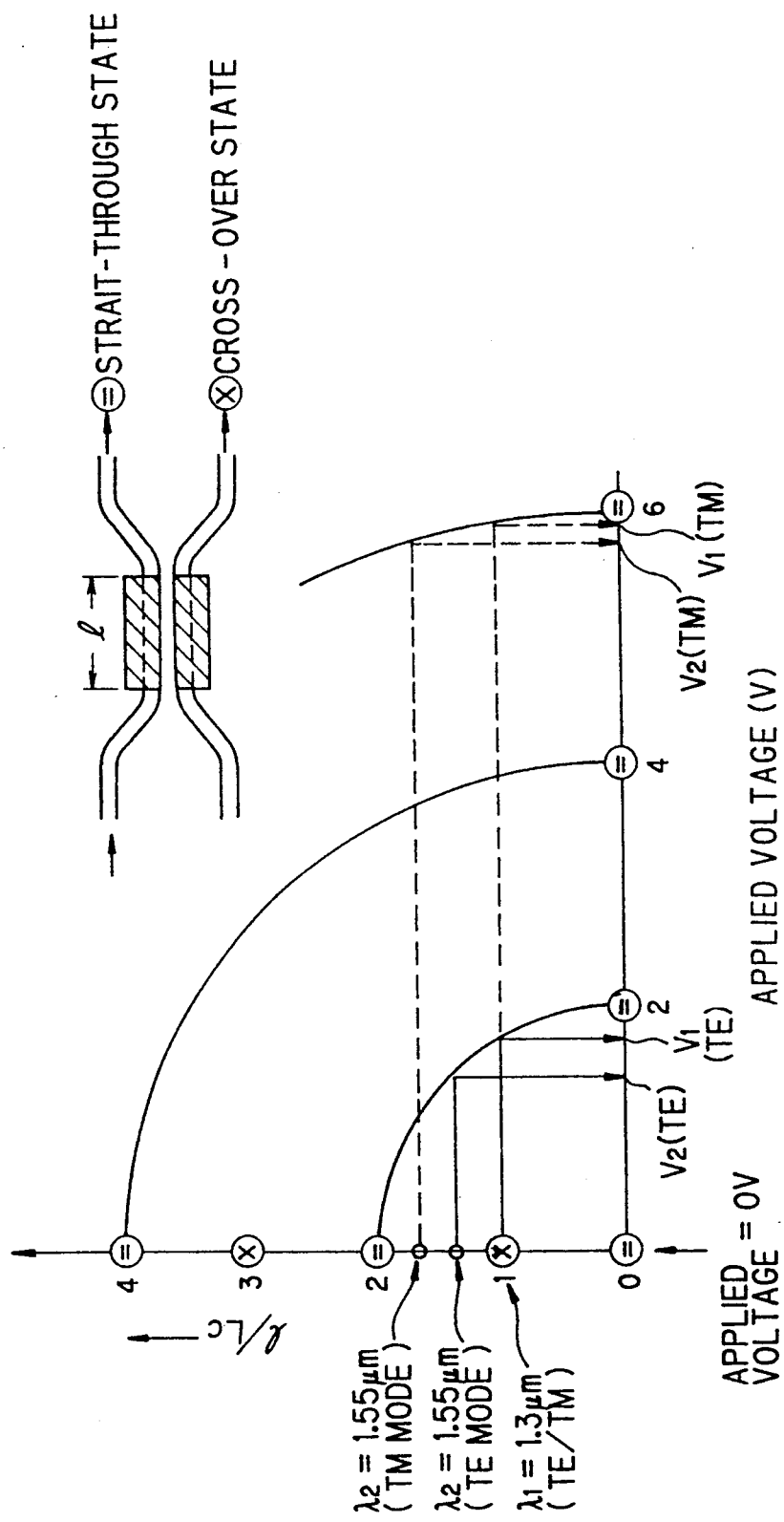
FIG. 13 is a switching chart of an optical waveguide switch in respect to wavelengths of 1.3 $\mu$m and 1.55 $\mu$m.

FIG. 13 is a switching chart of the first switching element 42. In a state where no voltage is applied to the electrodes (corresponding to the state on the vertical line in FIG. 13), the first switching element 42 is in a cross-over state as to the light of 1.3 $\mu$m in both TE and TM modes. On the other hand, the first switching element 42 is nearly in a straight-through state as to the light of 1.55 $\mu$m in both TE and TM modes, so that the first switching element 42 becomes straight-through state by applying a relatively low voltage as compared to the case of changing the state from being in complete cross-over state.

FIG. 14 shows switching characteristics of the first switching element 42. The first switching element 42 becomes straight-through state in case of the light of 1.55 $\mu$m by applying a voltage of 12 V and in case of a light 1.3 $\mu$m by applying a voltage of 21 V.

Thus, the first switching element 42 operates as a wavelength filter by applying a predetermined voltage. Thus, pratically, a light of 1.3 $\mu$m supplied to the first switching element 42 is supplied to the fourth switching element 45 by applying no voltage, while a light of 1.55 $\mu$m supplied thereto to supplied to the second switching element 43 by applying a voltage of 12 V.

Next, operation of the optical waveguide device will be explained. In the case of a light of 1.3 $\mu$m, the optical waveguide device becomes in ON state by applying no voltage to the first and fourth switching elements 42 and 45 and becomes in OFF state by applying a voltage of 21 V thereto. On the other hand, in case of a light of 1.55 $\mu$m, the optical waveguide device becomes in ON state by applying a voltage of 12 V to the first switching element 42 and no voltage to the second and third switching elements 43 and 44, and becomes in OFF state by applying no voltage to the first switching element 42 and a voltage of 21 V to the second and third switching elements 43 and 44.

Next, a 2-wavelength type OTDR using the optical waveguide device 40 will be described in conjunction with FIG. 15. In the OTDR, the optical waveguide switch 40 is connected at an input to an optical fiber 46 under measuring through which a light having a wavelength of $\lambda_1$ (=1.3 $\mu$m) or $\lambda_2$ (=1.55 $\mu$m) propagates, and at two outputs to first and second photodiodes 50 and 51 through first and second output optical fibers 47 and 48.

In operation, either a light of $\lambda_1$ (=1.3 $\mu$m) or a light of $\lambda_2$ (=1.55 $\mu$m) is irradiated from a laser diode (not shown) to the optical fiber 46 under measuring. The light which returned back is supplied to the optical waveguide device 40. The light is switched to be supplied to the first photodiode 50 if the wavelength thereof is 1.3 $\mu$m and to the second photodiode 51 if the wavelength thereof is 1.55 $\mu$m by setting the conditions of voltages applied to the switching elements as explained before.

Although the invention has been described with respect to specific embodiments for complete and clear disclosure, the appended claims are not to thus limit any alternative constructions that may occur to one skilled in the art whcih fairly fall within the basic teaching herein set forth.

What is claimed is:

1. An optical waveguide device, comprising:
   a plurality of optical directional coupler switches provided on a substrate, each of said optical directional coupler switches being provided with a pair of parallel waveguides;
   means for applying a voltage across said parallel waveguides; and
   light input and output terminals coupled to said optical directional coupler switches, wherein:
   at least a first one of said optical directional coupler switches operates independently of a polarization of light having a first predetermined wavelength by defining a width of said parallel waveguides and a distance therebetween being equal to first predetermined values, and at least a second one of said optical directional coupler switches operates independently of the polarization of light having a second predetermined wavelength by defining a width of said parallel waveguides and a distance therebetween being equal to second predetermined values, said parallel waveguides of said first and second one of said optical directional coupler switches being provided by diffusing films of the same thickness deposited in a predetermined pattern on said substrate thereinto by a predetermined diffusing condition.

2. An optical waveguide device, according to claim 1, further comprising:

dividing means for dividing a wavelength multiplexing light to at least two lights having said first and second predetermined wavelengths, said dividing means being positioned on a light input side relative to said first and second ones of said optical directional couplers.

3. An optical waveguide device, according to claim 1, wherein:

said at least first and second ones of said optical directional coupler switches include two serially connected optical directional coupler switches.

4. An optical waveguide device, according to claim 2, wherein:

said dividing means functions as an optical divider for lights of said first and second predetermined wavelenghts, and functions as an optical directional coupler switch for one of said lights of said first and second predetermined wavelengths.

5. An optical waveguide device, according to claim 1, wherein said first predetermined wavelength is equal to 1.3 $\mu$m and said second predetermined wavelength is equal to 1.55 $\mu$m.

* * * * *